United States Patent
Stewart et al.

(10) Patent No.: US 11,209,897 B2
(45) Date of Patent: Dec. 28, 2021

(54) STRENGTHENING PREDICTION CONFIDENCE AND COMMAND PRIORITY USING NATURAL USER INTERFACE (NUI) INPUTS

(71) Applicant: Lenovo (Singapore) Pte. Ltd., Singapore (SG)

(72) Inventors: Aaron Michael Stewart, Raleigh, NC (US); John Weldon Nicholson, Cary, NC (US); Corinna Paine Proctor, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1304 days.

(21) Appl. No.: 14/262,096

(22) Filed: Apr. 25, 2014

(65) Prior Publication Data
US 2015/0309561 A1 Oct. 29, 2015

(51) Int. Cl.
*G06F 3/01* (2006.01)

(52) U.S. Cl.
CPC ..................... *G06F 3/01* (2013.01)

(58) Field of Classification Search
CPC .... G06F 3/04883; G06F 3/0488; G06F 3/017; G06F 3/013; G06F 3/167; G06F 3/048; G06F 3/011
See application file for complete search history.

(56) References Cited

U.S. PATENT DOCUMENTS

| | | | | |
|---|---|---|---|---|
| 9,311,298 B2* | 4/2016 | Sarikaya | ............... | G06F 40/35 |
| 9,483,519 B2* | 11/2016 | Bastide | ............... | G06F 16/24 |
| 2005/0283532 A1* | 12/2005 | Kim | ............... | H04L 12/2829 709/225 |
| 2007/0239650 A1* | 10/2007 | Zangwill | ............... | G06N 5/04 706/60 |
| 2010/0295781 A1* | 11/2010 | Alameh | ............... | G06F 3/017 345/158 |
| 2011/0047478 A1* | 2/2011 | Ellsworth | ............... | H04L 45/586 715/747 |
| 2011/0154266 A1* | 6/2011 | Friend | ............... | G09B 5/06 715/863 |
| 2011/0173574 A1* | 7/2011 | Clavin | ............... | G06F 3/017 715/863 |
| 2011/0307435 A1* | 12/2011 | Overell | ............... | G06N 20/00 706/46 |
| 2012/0124255 A1* | 5/2012 | DiBartolomeo | ............... | G21D 3/00 710/104 |
| 2012/0197857 A1* | 8/2012 | Huang | ............... | G06F 3/017 707/706 |

(Continued)

FOREIGN PATENT DOCUMENTS

| | | |
|---|---|---|
| CN | 101989424 A | 3/2011 |
| CN | 103106390 A | 5/2013 |

*Primary Examiner* — Hua Lu (74) *Attorney, Agent, or Firm* — Ference & Associates LLC (57) ABSTRACT

An embodiment provides a method, including: receiving, at a device having at least one input device, a plurality of user inputs within a predetermined time; determining, using a processor of the device, a collective intent based on the plurality of user inputs; said determining comprising mapping at least two of the plurality of user inputs to a common command; and committing, using a processor of the device, an action according to the common command. Other aspects are described and claimed.

15 Claims, 4 Drawing Sheets

(56) References Cited

U.S. PATENT DOCUMENTS

| | | | |
|---|---|---|---|
| 2012/0242620 A1* | 9/2012 | Bos | G06F 3/0421 345/175 |
| 2013/0275164 A1* | 10/2013 | Gruber | G10L 17/22 705/5 |
| 2013/0275875 A1* | 10/2013 | Gruber | H04L 67/12 715/728 |
| 2014/0040274 A1* | 2/2014 | Aravamudan | G06F 16/3322 707/741 |
| 2014/0089286 A1 | 3/2014 | Delli Santi et al. | |
| 2014/0229405 A1* | 8/2014 | Govrin | G06N 5/04 706/11 |
| 2014/0237587 A1* | 8/2014 | Forbes | G06F 21/00 726/18 |
| 2014/0297268 A1* | 10/2014 | Govrin | G06N 5/04 704/9 |
| 2014/0347390 A1* | 11/2014 | Poulos | G06F 3/012 345/633 |
| 2015/0100943 A1* | 4/2015 | Gabel | G06F 8/30 717/106 |
| 2015/0112754 A1* | 4/2015 | Godsey | G06Q 30/0201 705/7.29 |
| 2015/0127347 A1* | 5/2015 | Tjalve | G10L 15/187 704/257 |
| 2015/0178371 A1* | 6/2015 | Seth | G06F 16/3329 707/748 |
| 2015/0254561 A1* | 9/2015 | Singal | G06F 16/24564 707/713 |
| 2015/0277730 A1* | 10/2015 | Rosenberg | E21B 47/13 715/753 |

\* cited by examiner

STRENGTHENING PREDICTION CONFIDENCE AND COMMAND PRIORITY USING NATURAL USER INTERFACE (NUI) INPUTS

BACKGROUND

Natural user interfaces (NUIs) utilize multiple input modalities (such as camera, voice, touch, etc.) to interpret natural language inputs and commit actions, e.g., mapped to predetermined commands. For example, NUIs are capable of parsing natural language user voice inputs to map these inputs to a predetermined command such that a user need not voice specific commands in order to make a system take various actions. This allows the user to more easily control the system using the NUI. NUIs have found application in many different device types and systems, e.g., tablet and laptop computing devices, gaming consoles, televisions and other entertainment devices, navigation systems, etc. These systems employ NUIs to allow users to more easily interface with applications provided by such systems.

BRIEF SUMMARY

In summary, one aspect provides a method, comprising: receiving, at a device having at least one input device, a plurality of user inputs within a predetermined time; determining, using a processor of the device, a collective intent based on the plurality of user inputs; said determining comprising mapping at least two of the plurality of user inputs to a common command; and committing, using a processor of the device, an action according to the common command.

Another aspect provides an apparatus, comprising: at least one input device; a processor operatively coupled to the at least one input device; and a memory storing instructions that are executable by the processor to: receive, at the at least one input device, a plurality of user inputs within a predetermined time; determine a collective intent based on the plurality of user inputs by mapping at least two of the plurality of user inputs to a common command; and commit an action according to the common command.

A further aspect provides a product, comprising: a computer readable storage device storing code therewith, the code being executable by a processor and comprising: code that receives, at a device having at least one input device, a plurality of user inputs within a predetermined time; code that determines, using a processor of the device, a collective intent based on the plurality of user inputs by mapping at least two of the plurality of user inputs to a common command; and code that commits, using a processor of the device, an action according to the common command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While natural user interfaces (NUIs) permit greater flexibility in terms of user inputs that may be handled, both in terms of the modality that may be used (e.g., voice, touch, gesture and the like) and in terms of the actual inputs used (i.e., offering more flexible handling of user inputs or providing a capability to map imprecise language or other inputs into a predetermined command actionable by the system), NUIs still tend to have a difficult time operating in multi-user environments such as the living room. One of the problems in this situation is when multiple users provide inputs at the same time (or within a predetermined time).

Multiple user input scenarios are a common situation. For example, a user might be trying to do a command that isn't working, and another user might try to help and do the command as well. In other situations, users may give inputs having similar intent but deliver different voice or gesture inputs to express this intent. The common result with conventional systems is to either act on the first command that is received and understood (e.g., to a predetermined confidence level) or to simply provide an error message and request further user input.

For example, typically either the simultaneous input from multiple users prevents the system from understanding either (if voice commands), or both commands are executed (e.g., if different modalities are used), which is often-times worse than doing nothing (e.g., one user performs a forward gesture and the other user does a return gesture—which cycles the system uselessly). Furthermore, redundant commands from multiple users are typically not given any type priority. In short, conventional NUIs have a difficult time determining a collective intent of the group in the face of multiple user inputs, whether complimentary, conflicting or simply ambiguous inputs are provided.

An embodiment adds a layer of sophistication to NUIs such that the system may automatically determine collective intent when a plurality of user inputs (e.g., similar commands or even conflicting commands) are input into the system within a predetermined time (e.g., from the same user or from multiple users). This may include automatically determining an input priority and/or adjusting the confidence of input recognition in predicting collective intent.

The illustrated example embodiments will be best understood by reference to the figures. The following description is intended only by way of example, and simply illustrates certain example embodiments.

Figure 1:
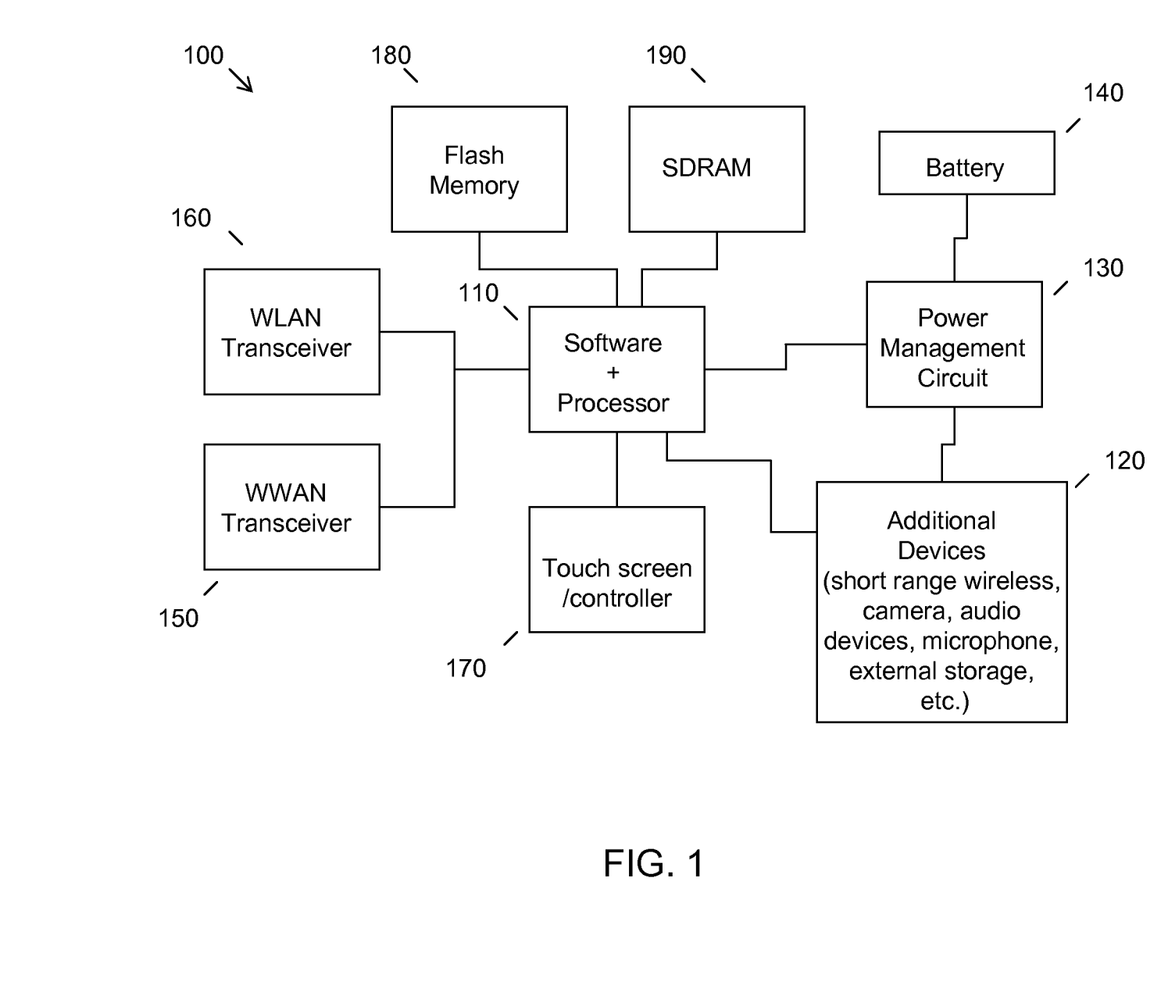
FIG. 1 illustrates an example of information handling device circuitry.

While various other circuits, circuitry or components may be utilized in information handling devices (also referred to herein as apparatuses, electronic devices, or simply devices), with regard to smart phone and/or tablet circuitry 100, an example illustrated in FIG. 1 includes a system on a circuit design found for example in tablet or other mobile computing platforms. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the processor, memory control, and I/O controller hub all into a single circuit 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera and/or a microphone that accepts user inputs and provides data related thereto an NUI. System 100 often includes a touch screen 170 for data input and display/rendering. System 100 also typically includes various memory devices, for example flash memory 180 and SDRAM 190.

Figure 2:
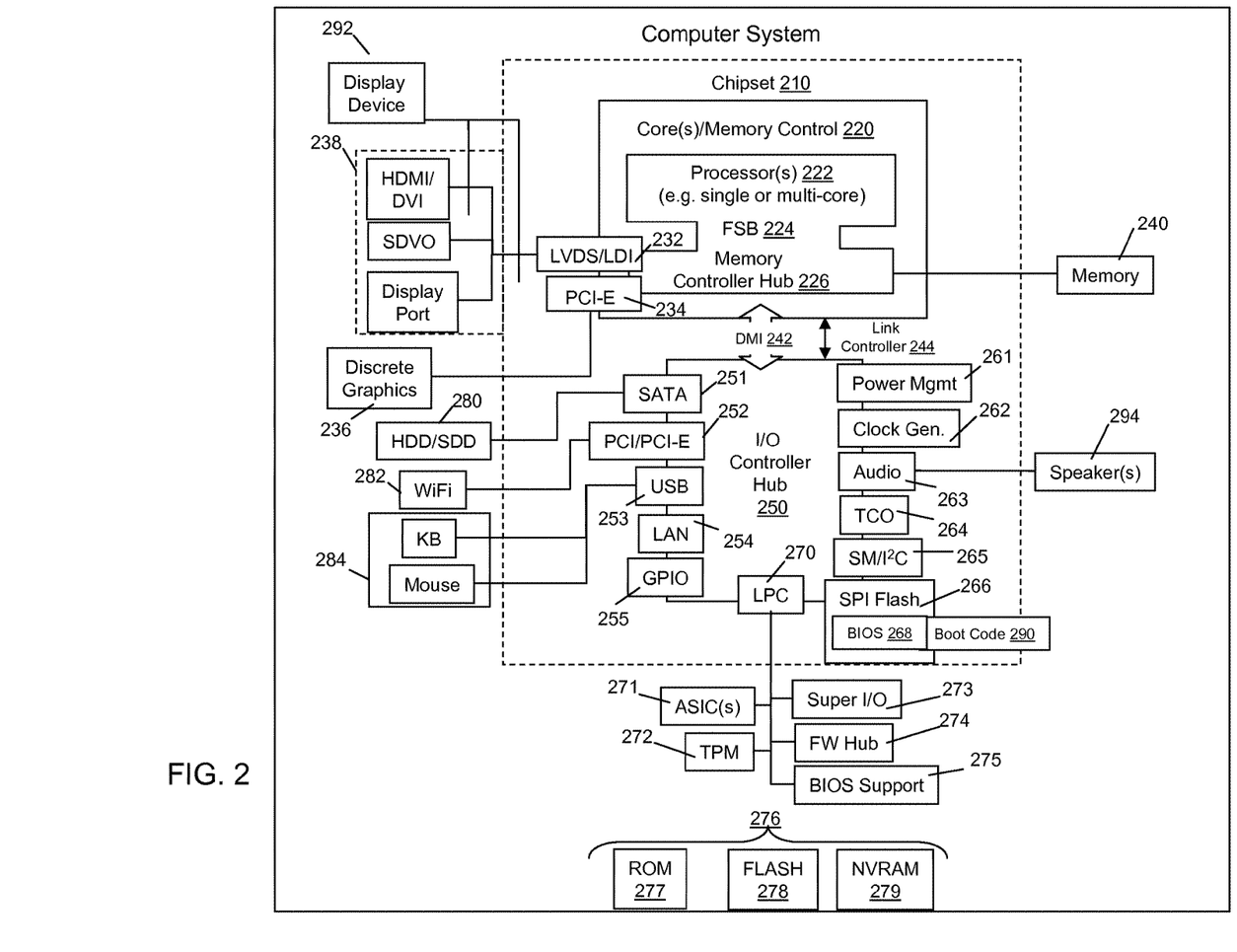
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Circuitry, as for example outlined in FIG. 1 or FIG. 2, may be used to implement a NUI that offers users a more flexible and easy to use input interface for controlling the system and applications running thereon. For example, circuitry such as that outlined in FIG. 1 and FIG. 2 may be used in many different device types and systems, e.g., tablet and laptop computing devices, gaming consoles, smart TVs and other entertainment devices, navigation systems, etc., to provide a NUI as described herein, allowing users to more easily interface with applications provided by such systems.

Figure 3:
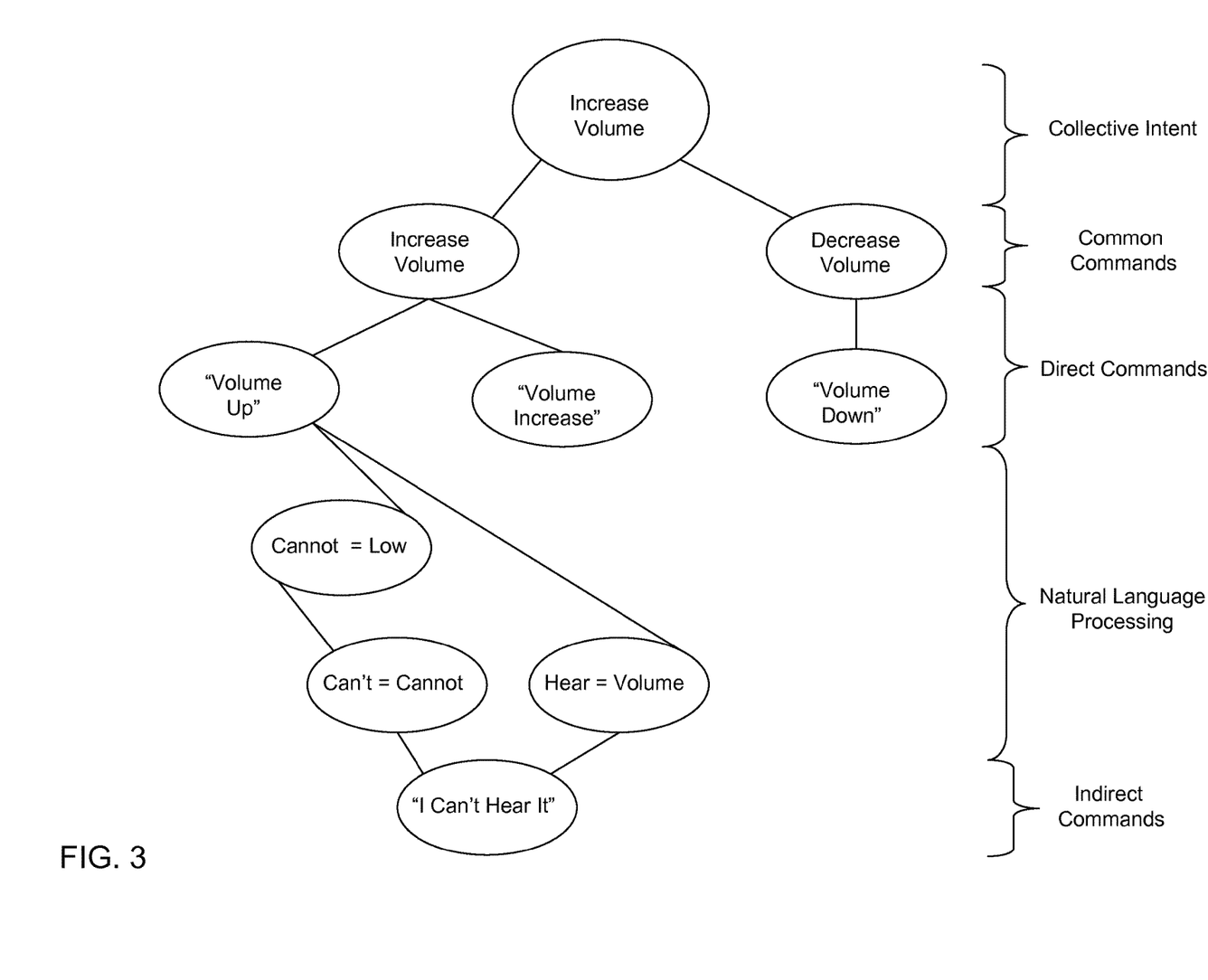
FIG. 3 illustrates an example hierarchy of user inputs that may be used in determining collective intent.

Referring to FIG. 3, an example hierarchy of user inputs that may be used in determining collective intent by an NUI is illustrated. As shown in FIG. 3, two or more direct commands, e.g., user voice inputs of "Volume Up" and "Volume Increase", may be received and be understood by an embodiment as mapping to a common command understood by the NUI, e.g., an Increase Volume common command that the system uses to increase the volume of a running application, e.g., media player application. Thus, in such a scenario, the intent of each direct command is effectively the same and maps to a collective intent, e.g., Increase Volume in this example. An embodiment thus utilizes such logic to determine that two such direct commands received in succession within a predetermined time (or simultaneously) are to be mapped as a single input reflecting the collective intent of the group (or, if a single user, consolidation of the single user's multiple inputs).

An embodiment may also map two or more user inputs that involve direct and indirect commands, e.g., using natural language processing. By way of specific example, a user voice input of a direct command such as "Volume Up" and another user voice input of an indirect command such as "I Can't Hear It" may be mapped again to a collective intent of "Increase Volume". In this example, the indirect command (which may not be an intentional command but rather system captured input that the user did not intend as input or as a specific command) may be processed using a natural language processor. In the example illustrated (which is a non-limiting example), the natural language processing may include parsing the user input of "I Can't Hear It" into component parts that are then mapped into a common node, e.g., "Volume Up" direct command in the example illustrated.

In a similar fashion, although not explicitly illustrated in FIG. 3, an embodiment may process user inputs that have been received using different modalities. For example, a direct voice command of "Volume Up" and similar gesture input (e.g., user raising his or her hand upward) may be mapped to a common command of "Volume Up". An embodiment may thus utilize multiple user input modalities to determine or infer the collective intent, in this example that an increase in volume action should be committed. Because there are two or more related commands delivered in effectively equivalent time frames, the confidence in recognizing and determining intent of the individual commands should thus increase.

For example, an embodiment facilitates confidently determining or predicting the collective intent and ultimate priority of the command essence using such processing of the plurality of user inputs. In many cases, seemingly redundant, ambiguous or even conflicting user inputs received in short order may processed such that the ultimate confidence of the collective intent determination may be adjusted upward in such scenarios.

By way of example, one or more direct commands and one or more indirect commands may be received, literally understood by the system to map to a common command, and thus used to increase the confidence of the collective intent determination because these inputs are related or complimentary. By way of specific example, if User A gives a direct command of "Volume Up" while User B says "I Can't Hear It" (i.e., an indirect command for "Volume Up"), an embodiment may utilize the fact that these two commands are related and in fact compliment one another. It should be noted that this example extends to others in which different input modalities are involved. Because there are two or more related commands delivered in effectively equivalent time frames, the confidence in recognizing and determining intent of the individual commands should thus increase, avoiding potential ambiguities in received user inputs that result in error messages using conventional NUIs. In this example, the confidence levels assigned by the NUI in predicting the collective intent and ultimate priority of the command essence could be adjusted upward given the complimentary inputs received, even if each individually is only partially recognized (i.e., has a low recognition confidence assigned thereto).

It will be appreciated then that where two or more commands are at least partially understood, an embodiment may likewise map the commands to the fundamental intent of each command and determine that they relate to a common or collective intent. When ambiguous commands or user inputs are received (e.g., partially recognized speech or gestures, etc.), an embodiment may utilize the fact that two or more of these partially recognized commands map to a unitary collective intent and adjust upward the collective confidence such that an action may be executed instead of issuing an error message related to one or both of the commands considered individually. In other words, because there are two or more related commands delivered in effectively equivalent time frames, the confidence in recognizing and determining intent of the individual commands should increase. In this situation, confidence in predicting the collective intent and ultimate priority of the command essence would be adjusted upward by an embodiment.

It will be understood that based on how much is understood of each command, an embodiment may either execute the most likely collective intent or prompt the users for further input allowing a more precise determination, e.g., confirmation question or query. As with the other embodiments described herein, this example extends to examples in which different input modalities are involved.

By way of specific example, if an embodiment detects User A saying "make it louder", the system's recognition possibilities may be "bake some chowder" (90% confidence) and "make it louder" (80% confidence). An embodiment may also detect (i.e., within a predetermined time) that User B says "I can't hear it", with the system's recognition possibilities being: "I can't hear it" (80% confidence) and "I can't bear it" (50% confidence). Traditionally, this would result in an error as the higher confidence recognition of User A is not actionable by the system (i.e., this user input does not map to a predetermined actionable command) and, although actionable, "I can't hear it" input of User B conflicts with User A's highest confidence input, which may have been received first. However, an embodiment may consider these inputs together in order to infer the collective intent. Thus, an embodiment may change the confidence value(s), e.g., of the individual inputs and or of the aggregate confidence value, such that the appropriate collective intent is mapped to an actionable command, in this case an increase volume command. In this example, an embodiment may determine that, given two of the commands map to a common collective intent, even with low confidence individually, collectively these commands supersede any individual confidence score for a command considered in isolation.

Where there are conflicts in a plurality of user inputs, even confidently recognized ones, an embodiment may nonetheless resolve these conflicting inputs to an actionable collective intent. By way of example, for three or more commands that are at least partially understood yet conflicting, the collective intent may be inferred to be that intent to which the majority of these commands map to (either directly or indirectly).

By way of specific example, if User A and User B deliver a command to that maps to an increase volume command, while User C simultaneously (or nearly so) provides input to decrease the volume, an embodiment implementing a majority rules determination may map the collective intent to the increase volume collective intent, e.g., as illustrated in the non-limiting example of FIG. 3.

An embodiment may additionally or alternatively infer the collective intent using other mechanisms. For example, in all situations, confidence and/or priority scoring or ranking may be adjusted according to whether commands are input from the same or different modalities, by considering any time differences between deliveries of the commands (e.g., sequence of receipt or detection of commands), by considering any existing priority or weight assigned to the input modalities used to provide the commands, by considering any existing priority or weight assigned to the users providing the commands, by considering information logged about how commonly a specific command is delivered by any of the users involved and/or by a user using a particular modality (e.g., a user's preferred modality may be given greater weight), etc. By way of specific example, if User A typically adjusts volume by saying "make it louder", whereas User B typically adjusts volume by saying "volume up", an embodiment may be on the look out for each of these modalities being used by the respective users in making confidence level determinations. The users may be identified using a variety of techniques, e.g., a biometric identification such as voice recognition.

Figure 4:
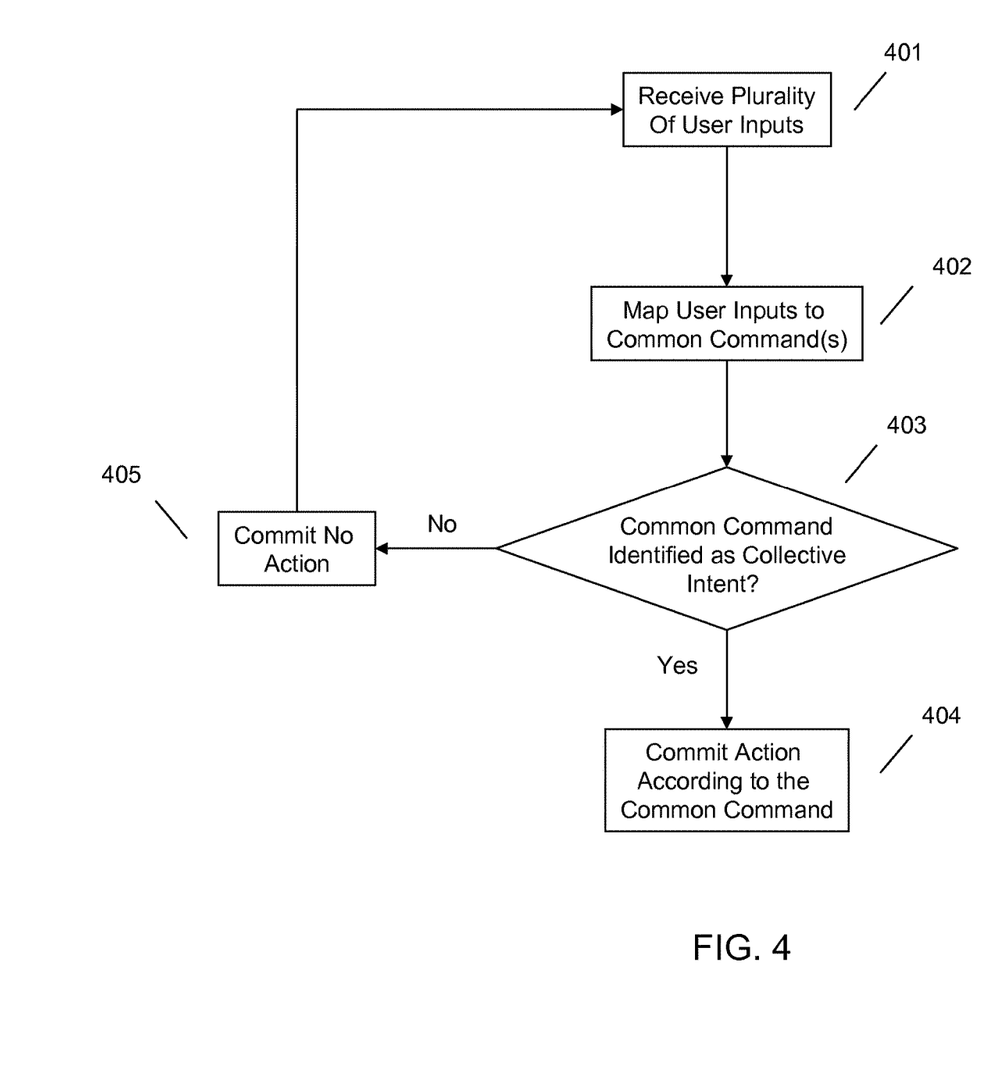
FIG. 4 illustrates an example method of strengthening prediction confidence and command priority using NUI inputs.

Referring to FIG. 4 then, an example method of strengthening prediction confidence and command priority using NUI inputs is illustrated. An embodiment may receive a plurality of user inputs at 401, e.g., using one or more modalities such as receiving voice commands using a microphone of the device, detecting gesture inputs using a camera and gesture recognition engine of the device, etc. As described herein, at least one of the plurality of user inputs may be a natural language input such that it does not map directly to a predetermined device command.

An embodiment may thereafter determine at 402 that at least two of the plurality of user inputs map to a common command. As outlined in FIG. 3, there are a variety of ways in which user inputs may compliment one another even if seemingly ambiguous, and even if the inputs do actually conflict, establishing that more than one command maps to a common command is useful in resolving the conflicts.

By such mapping then an embodiment may determine at 403 if a collective intent may be identified based on the plurality of user inputs. This may occur because the user inputs actually compliment one another or are related enough that a single common command may be identified as the collective intent at 403. An embodiment may also resolve conflicts within the plurality of inputs, e.g., using majority rules process to identify the common command that reflects the collective intent at 403. If a collective intent is determined or identified at 403, an embodiment may commit an action at 404 according to the common command, e.g., increasing the volume of a media application, selecting a link to a web page in a web browser, etc. Otherwise, an embodiment may require more data to identify the collective intent and take no action at 405. An embodiment may query or request more input from the user(s) and/or await further input in hopes of identifying the collective intent.

The determining may include identifying the common command based on the number of user inputs mapping thereto, e.g., to resolve a conflicting commands scenario. The determining may include identifying the common command based on aggregating confidence levels associated with the plurality of user inputs with respect to the common command, e.g., to resolve commands or inputs that alone are ambiguous, un-actionable, etc. As described herein, the determining may include determining and taking into account a modality used for inputting one or more of the plurality of user inputs, e.g., applying a weighting factor to a particular modality in determining the collective intent. For example, an embodiment may identify a preferred modality of a particular user providing one or more of the plurality of user inputs and apply additional weight in determining the collective intent to a user input of the particular user if the preferred modality has been utilized to provide one or more of the plurality of user inputs. In a similar fashion, an embodiment may take into account a preferred command of a particular user providing one or more of the plurality of user inputs, and apply a weighting factor if an embodiment identifies a user is providing a preferred command. Likewise, certain users may be given priority in making commands that are acted upon, thus a weighting factor may be applied to achieve the same.

Accordingly, an embodiment provides various mechanisms by which the collective intent of the user inputs may be determined or inferred. By virtue of processing the user inputs in a coordinated fashion, an embodiment improves the functionality of an NUI by reducing the errors made when faced with multiple user inputs and facilitates confident decision making by the system, even when ambiguous or conflicting user inputs are received.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at a device having at least one input device, a plurality of user inputs within a predetermined time, wherein at least two of the plurality of user inputs are received from different users, wherein at least two of the plurality of user inputs comprise conflicting inputs;
determining, using a processor of the device, a collective intent based on the plurality of user inputs, wherein the collective intent comprises a single intent of a grouping of the different users and is identified from the plurality of user inputs and mapped to an actionable command, wherein the determining is based upon determining a particular command of each of the plurality of user inputs, a confidence score of the at least two of the plurality of user inputs from different users, and the particular command of each of the plurality of users, wherein a preferred command is based upon a common delivery of an input of each user of the plurality of user inputs, wherein a weighting factor is applied in determining the particular command and the collective intent to a user input of the particular user if the preferred command has been utilized to provide one or more of the plurality of user inputs, wherein the confidence score is based upon a priority of each of the plurality of user inputs and a confidence of an individual user input based upon a predetermined actionable command;
identifying the preferred command of a particular user providing one or more of the plurality of user inputs, wherein an additional weighting factor is applied in determining the collective intent to a user input of the particular user if the preferred command has been identified as a candidate for the common command;
said determining comprising mapping the at least two of the plurality of user inputs to a common command and resolving the at least one conflicting command; and
committing, using a processor of the device, an action according to the common command.

2. The method of claim 1, wherein:
said plurality of user inputs comprise a first user input that is different than a second user input; and
said determining comprises mapping the first user input and the second user input to the common command by changing a weighting of one of the first user input and the second user input based on the other of the first user input and the second user input.

3. The method of claim 1, wherein:
said plurality of user inputs comprise two or more user inputs that map to the common command and at least one user input mapping to a different command; and
the determining comprises identifying the common command based on the number of user inputs mapping thereto.

4. The method of claim 1, wherein the determining comprises identifying the common command based on aggregating confidence levels associated with the plurality of user inputs with respect to the common command.

5. The method of claim 1, wherein:
the determining comprises identifying a user providing one or more of the plurality of user inputs; and
a weighting factor is applied to user input of a particular user in determining the collective intent.

6. The method of claim 1, wherein:
the determining comprises identifying timing information of one or more of the plurality of user inputs; and
a weighting factor is applied to user input provided at a particular time within the predetermined time in determining the collective intent.

7. The method of claim 1, wherein the user input is selected from the group consisting of a voice input and a gesture input.

8. An apparatus, comprising:
at least one input device;
a processor operatively coupled to the at least one input device; and
a memory storing instructions that are executable by the processor to:
receive, at the at least one input device, a plurality of user inputs within a predetermined time, wherein at least two of the plurality of user inputs are received from different users, wherein at least two of the plurality of user inputs comprise conflicting inputs;
determine a collective intent based on the plurality of user inputs by mapping the at least two of the plurality of user inputs to a common command and resolving the at least one conflicting command, wherein the collective intent comprises a single intent of a grouping of the different users and is identified from the plurality of user inputs and mapped to an actionable command, wherein the determining is based upon determining a particular command of each of the plurality of user inputs, a confidence score of the at least two of the plurality of user inputs from different users, and the particular command of each of the plurality of users, wherein the preferred command is based upon a common delivery of an input of each user of the plurality of user inputs, wherein a weighting factor is applied in determining the particular command and the collective intent to a user input of the particular user if the preferred command has been utilized to provide one or more of the plurality of user inputs, wherein the confidence score is based upon a priority of each of the plurality of user inputs and a confidence of an individual user input based upon a predetermined actionable command;

identifying the preferred command of a particular user providing one or more of the plurality of user inputs, wherein an additional weighting factor is applied in determining the collective intent to a user input of the particular user if the preferred command has been identified as a candidate for the common command; and commit an action according to the common command.

9. The apparatus of claim 8, wherein:

said plurality of user inputs comprise a first user input that is different than a second user input; and to determine comprises mapping the first user input and the second user input to the common command by changing a weighting of one of the first user input and the second user input based on the other of the first user input and the second user input.

10. The apparatus of claim 8, wherein:

said plurality of user inputs comprise two or more user inputs that map to the common command and at least one user input mapping to a different command; and to determine comprises identifying the common command based on the number of user inputs mapping thereto.

11. The apparatus of claim 8, wherein to determine comprises identifying the common command based on aggregating confidence levels associated with the plurality of user inputs with respect to the common command.

12. The apparatus of claim 8, wherein:

to determine comprises identifying a user providing one or more of the plurality of user inputs; and a weighting factor is applied to user input of a particular user in determining the collective intent.

13. The apparatus of claim 8, wherein:

to determine comprises identifying timing information of one or more of the plurality of user inputs; and a weighting factor is applied to user input provided at a particular time within the predetermined time in determining the collective intent.

14. The apparatus of claim 8, wherein the at least one user input device is selected from the group consisting of a voice input device, and a gesture system including a camera.

15. A product, comprising:

a computer readable storage device storing code therewith, the code being executable by a processor and comprising:

code that receives, at a device having at least one input device, a plurality of user inputs within a predetermined time, wherein at least two of the plurality of user inputs are received from different users, wherein at least two of the plurality of user inputs comprise conflicting inputs;

code that determines, using a processor of the device, a collective intent based on the plurality of user inputs by mapping the at least two of the plurality of user inputs to a common command and resolving the at least one conflicting command, wherein the collective intent comprises a single intent of a grouping of the different users and is identified from the plurality of user inputs, wherein the determining is based upon determining a particular command of each of the plurality of user inputs, a confidence score of the at least two of the plurality of user inputs from different users, and the particular command of each of the plurality of users, wherein a preferred command is based upon a common delivery of an input of each user of the plurality of user inputs, wherein a weighting factor is applied in determining the particular command and the collective intent to a user input of the particular user if the preferred command has been utilized to provide one or more of the plurality of user inputs, wherein the confidence score is based upon a priority of each of the plurality of user inputs and a confidence of an individual user input based upon a predetermined actionable command;

identifying the preferred command of a particular user providing one or more of the plurality of user inputs, wherein an additional weighting factor is applied in determining the collective intent to a user input of the particular user if the preferred command has been identified as a candidate for the common command; and code that commits, using a processor of the device, an action according to the common command.

* * * * *